(12) United States Patent
Koskinen et al.

(10) Patent No.: US 9,439,120 B2
(45) Date of Patent: Sep. 6, 2016

(54) METHOD AND APPARATUS FOR MANAGING INFORMATION IN A NETWORK

(75) Inventors: Jussi-Pekka Koskinen, Oulu (FI); Jarkko Koskela, Oulu (FI); Ilkka Keskitalo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/431,869

(22) PCT Filed: Aug. 28, 2012

(86) PCT No.: PCT/FI2012/050934
§ 371 (c)(1),
(2), (4) Date: Mar. 27, 2015

(87) PCT Pub. No.: WO2014/049195
PCT Pub. Date: Apr. 3, 2014

(65) Prior Publication Data
US 2015/0289180 A1    Oct. 8, 2015

(51) Int. Cl.
| | |
|---|---|
| *H04W 36/00* | (2009.01) |
| *H04W 36/14* | (2009.01) |
| *H04W 36/30* | (2009.01) |
| *H04W 88/08* | (2009.01) |
| *H04W 8/22* | (2009.01) |

(52) U.S. Cl.
CPC ......... *H04W 36/14* (2013.01); *H04W 36/0011* (2013.01); *H04W 36/0033* (2013.01); *H04W 36/30* (2013.01); *H04W 8/22* (2013.01); *H04W 88/08* (2013.01)

(58) Field of Classification Search
CPC ........... H04W 36/14; H04W 36/0011; H04W 36/30; H04W 36/0055; H04W 88/08
See application file for complete search history.

(56) References Cited

U.S. PATENT DOCUMENTS

2011/0269466 A1   11/2011   McGilly

FOREIGN PATENT DOCUMENTS

| WO | WO 2007149509 A2 | 12/2007 |
|---|---|---|
| WO | WO 2008157717 A1 | 12/2008 |
| WO | WO 2009097906 A1 | 8/2009 |

*Primary Examiner* — Martin Mushambo
(74) *Attorney, Agent, or Firm* — Seppo Laine Oy

(57) ABSTRACT

In accordance with an example embodiment of the present invention, there is provided an apparatus, comprising at least one processing core configured to determine that information associated with the apparatus, stored in the apparatus, has changed, a receiver configured to receive a handover instruction instructing the apparatus to handover to a second base station, the at least one processing core being configured to cause the transmitter to inform the second base station of the changed information, wherein the at least one processing core is configured to perform the informing only if at most a predefined length of time elapses between the determination and associating with the second base station. The information may comprise preference or status information, for example.

19 Claims, 4 Drawing Sheets

METHOD AND APPARATUS FOR MANAGING INFORMATION IN A NETWORK

TECHNICAL FIELD

The present application relates generally to managing information in a network, such as a wireless network.

BACKGROUND

A cellular communications network typically comprises a plurality of individual cells. A cell is typically controlled by a base station, which may be connected to a backbone network by a wire-line connection. The backbone network may connect base stations to each other, to base station controllers or to core network nodes. Base stations communicate with mobile stations within cell coverage areas of their cells using a wireless radio interface. A base station may control more than one cell.

A mobile may change attachment from a first cell to a second cell as it moves around in the overall coverage area of the cellular communication system. A change in attachment may be referred to as a handover or handoff. In handover, a mobile may be handed over from a source base station to a target base station. A handover may be initiated responsive to a measurement report being received from a mobile in a base station, the measurement report indicating that radio conditions at the mobile have changed so that another cell, which will become the target cell for the handover, has become more suitable for radio communication with the mobile.

Mobiles may prefer different treatment from the network, for example, a mobile may prefer to use a certain version of a speech codec, a certain kind of pattern of discontinuous reception, DRX, or other parameter that is not mandated by the network to be set to a certain value. During handover, a source base station may inform the target base station of preferences expressed by the mobile, so the target base station becomes capable, to an extent, of anticipating the mobiles behavior.

SUMMARY

Various aspects of examples of the invention are set out in the claims.

According to a first aspect of the present invention, there is provided An apparatus, comprising at least one processing core configured to determine that information associated with the apparatus, stored in the apparatus, has changed, a receiver configured to receive a handover instruction instructing the apparatus to handover to a second base station, the at least one processing core being configured to cause the transmitter to inform the second base station of the changed information, wherein the at least one processing core is configured to perform the informing only if at most a predefined length of time elapses between the determination and associating with the second base station.

According to a second aspect of the present invention, there is provided a method, comprising determining that information associated with an apparatus, stored in the apparatus, has changed, receiving a handover instruction instructing the apparatus to handover to a second base station, and causing informing of the second base station of the changed information, wherein performing the informing only occurs if at most a predefined length of time elapses between the determination and associating with the second base station.

According to a third aspect of the present invention, there is provided an apparatus, comprising at least one processor, at least one memory including computer program code the at least one memory and the computer program code configured to, with the at least one processor, cause the apparatus to at least receive a handover request from a first base station, the handover request involving a first mobile station, and transmit a handover message to the first base station, the handover message comprising at least one indication of information associated with the first mobile station stored in the apparatus.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
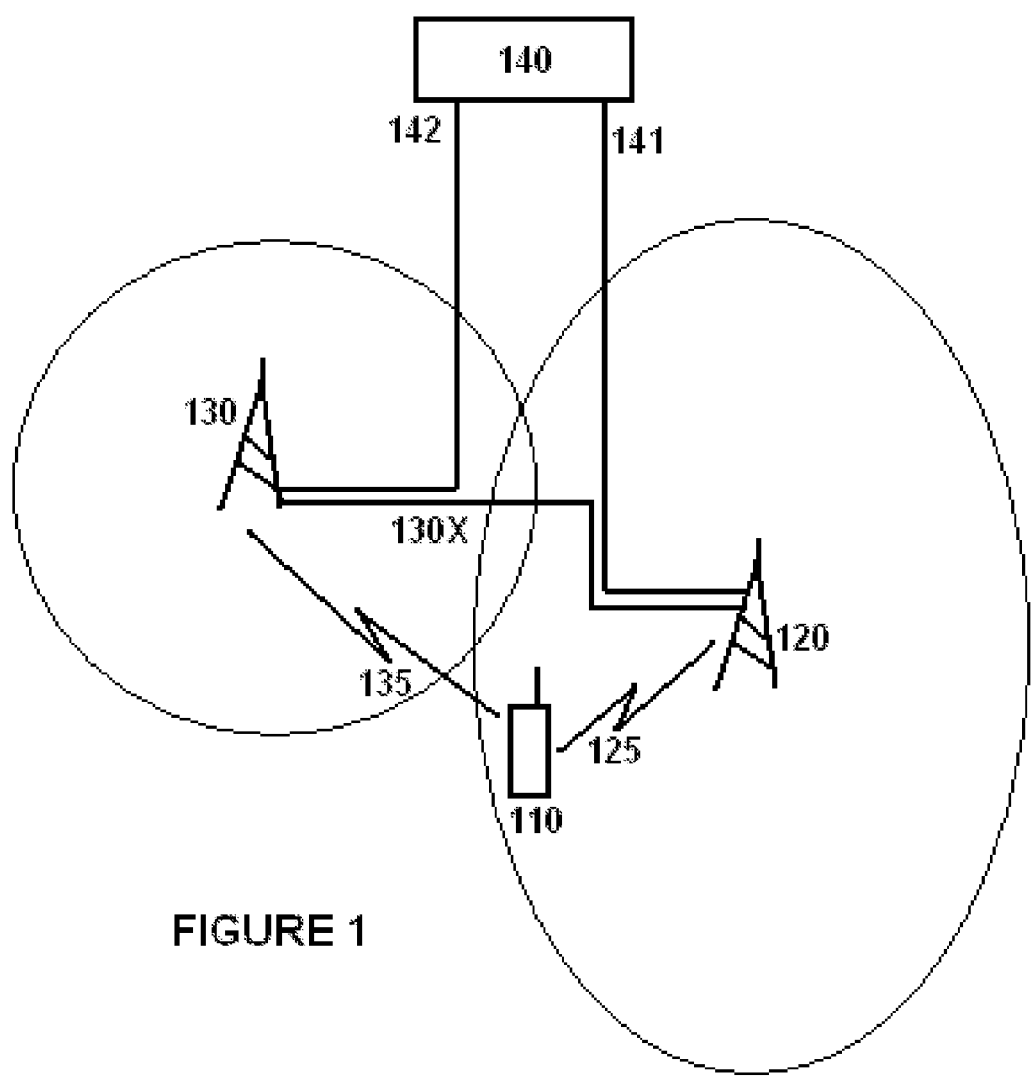
FIG. 1 illustrates an example of a system, in this example a cellular system, capable of supporting some embodiments of the invention.

FIG. 1 illustrates an example of a system, in this example a cellular system, capable of supporting some embodiments of the invention. Illustrated in FIG. 1 is mobile 110, which may be, for example, a smart phone, a tablet or laptop computer, cellular phone, personal digital assistant, machine-to-machine, M2M, automated device or an other, similar apparatus. Mobile 110 may be a user equipment, UE, in the sense of wideband code division multiple access, WCDMA, or long term evolution, LTE, standards defined by the third generation partnership project, 3GPP, for example.

FIG. 1 also illustrates base station 120 and base station 130. Base station 120 and base station 130 may be essentially similar, for example they may act as base stations in the same system. In some embodiments, base station 120 and base station 130 are base stations comprised in a WCDMA or LTE cellular system. As a terminological point, a WCDMA base station may be known as a node-B. Similarly a LTE base station may be known as an eNB. Mobile 110 may be communicatively connected to base station 120 via wireless link 125. Wireless link 125 may operate in accordance with a defined standard, for example WCDMA or LTE, or where mobile 110 is capable of communicating with wireless local area network, WLAN, access points wireless link 125 may operate in accordance with WLAN standards. Also other standards, all of which cannot be named here for the sake of conciseness, are possible. Wireless link 125 may comprise an uplink for conveying information from mobile 110 to base station 120. Wireless link 125 may comprise a downlink for conveying information from base station 120 to mobile 110. The uplink and/or downlink of wireless link 125 may operate in a time division multiple access, TDMA, frequency-division multiple access, FDMA, code-division multiple access, CDMA, orthogonal frequency division multiple access, OFDMA, manner or in a manner that is a combination of at least two of the foregoing multiple access methods.

Wireless link 135 connecting mobile 110 to base station 130 may be similar to wireless link 125, or alternatively it may be different. For example, where wireless link 125 operates according to WLAN and wireless link 135 operates according to LTE, the overall system comprising base station 120 and base station 130 is a multi-standard system supporting also inter-radio-access technology, inter-RAT, handovers. Alternatively where wireless link 125 conforms to LTE standards, wireless link 135 may also conform to LTE standards.

Signaling connection 130X interconnects base station 120 and base station 130. Signaling connection 130X may be a wire-line connection, for example, or alternatively a wireless link, such as for example a directional microwave link. Using signaling connection 130X, base station 120 and base station 130 may exchange information to facilitate functioning of the cellular system, for example the base stations may exchange inter-base station handover signaling information to facilitate handing mobiles over from base station 120 to base station 130, and vice versa. In handover situations, the base stations may agree with each other using signaling connection 130X the terms and timing of a handover, and the target base station may promise a certain quality of service to a mobile handing over in order to offer it a similar connection in the target cell as it was offered in the source cell. In some embodiments the base stations may exchange status or load information with each other, for example base station 130 may inquire whether base station 120 is near its maximum capacity and base station 120 may responsively provide its load status to base station 130. In LTE systems, signaling connection 130X may be known as an X2-interface.

Base station 120 is connected to a network node 140 by means of signaling connection 141. Like signaling connection 130X, signaling connection 140 may be wire-line or wireless. Signaling connection 141 may be used by the cellular system to manage base station 120, for example by providing access to authorization functions for authorizing mobiles 110 that are switched in within a cell controlled by base station 120 for access to the cellular system. Signaling connection 141 may be used to assign frequency and/or code resources to a cell controlled by base station 120. Signaling connection 141 may be used to update software controlling the functioning of base station 120. Signaling connection 141 may also or alternatively be used to provide access to further networks, such as the Internet, to mobiles attached to base station 120.

With respect to base station 130, signaling connection 142 may be substantially similar to signaling connection 141 with respect to base station 120.

Network node 140 may be, depending on the embodiment, a radio-access network controller or a core network node. In a WCDMA embodiment, for example, network node 140 may be a radio network controller, RNC. In a LTE embodiment, network node 140 may be a mobility management entity, MME or a serving gateway, SGW, for example. Network node 140 may be connected to further nodes, such as core network nodes, by signaling connections that are not illustrated in FIG. 1. In general a core network may comprise nodes that control the functioning of a cellular system on a system-wide level. These nodes may include switches, authorization servers, subscriber databases, transcoding nodes and gateway nodes providing access to further networks.

When mobile 110 moves, or roams, in a cell controlled by base station 120 toward a cell controlled by base station 130, mobile 110 may observe in measurements it conducts that a signal strength of a beacon channel, such as for example a synchronization channel or common reference symbols, transmitted by base station 120 declines, while that of a beacon channel transmitted by base station 130 increases. Mobile 110 may be configured to transmit measurement reports to the system, or mobile 110 may be configured to determine autonomously that a handover is needed. Where mobile 110 is configured to transmit measurement reports to the system, mobile 110 may transmit the measurement reports to a base station currently serving mobile 110, such as for example base station 120. The serving base station may responsively either decide to negotiate with base station 130 concerning initiating the handover, or alternatively base station 120 may forward the reports to network node 140 for actions relating to handover. Where mobile 110 is configured to determine autonomously that a handover is needed, mobile 110 may be configured to transmit a handover request to at least one of base station 120 and base station 130.

A successful handover occurs when mobile 110 is switched from a cell controlled by base station 120 to a cell controlled by base station 130 around the time mobile 110 roams over the geographical boundary between the two cells. In this process, the serving base station changes from base station 120 to base station 130. In this example the cell of base station 120 is known as the source cell and the cell of base station 130 is is known as the target cell. A defective handover occurs where mobile 110 is switched too late, for example, and proceeds into the cell controlled by base station 130 before being handed over. The handover may become defective in this case since communications with base station 120 may fail before new communications are established with base station 130, creating a discontinuity in service to mobile 110.

Mobile 110 may express information associated itself to the network, for example by signaling to the serving base station. Information may comprise preference information, such as for example where mobile 110 prefers to be configured into a default power saving configuration, or alternatively into a highly power saving configuration. A power saving configuration may comprise, for example, a discontinuous reception, DRX, pattern, wherein mobile 110 keeps its radio receiver in a low-power, inactive state for a time, only to cause it to transition to an active state to receive communications from the serving base station. Where a DRX pattern defines that the receiver may be kept off for 90% of the time, for example, significant power savings may be obtained. A DRX pattern for mobile 110 may be decided in the serving base station or another network node, for example, and communicated to mobile 110 in signaling. A DRX pattern with a larger fraction of time in an active state may consume more battery power in mobile 110, but offer more frequent opportunities for communication, which reduces an expected latency in communication. In contrast a DRX pattern with a smaller fraction in an active state may save more battery power, but offer more infrequent opportunities for communication which increases an expected latency in communication. Thus the DRX pattern may be seen to offer a tradeoff between battery conservation and communication latency. Other aspects of a power-saving configuration may comprise a parameter indicating whether DRX is to be used or not.

In an example, three power-saving configurations may be defined. Firstly, a configuration with no DRX. Secondly, a configuration with DRX and a high fraction of time in an active state. Thirdly, a configuration with DRX and a low fraction of time in an active state. As another example, two power-saving configurations may be defined and mobile 110 may express a preference for either one of the two, for example with a single bit in a signaling message. Alternatively, mobile 110 may indicate preference for power saving without prior definitions of the power saving configurations.

Other examples of preference information mobile 110 may express to the network include a preference for certain version of a codec used to encode speech or video, and a preference for a certain encryption algorithm such as 3des or blowfish. Another example of information associated with mobile 110 is status information, for example power status information. Power status information may comprise information indicating whether mobile 110 is powered by a stable power supply or by a battery. Power status information may comprise battery level status information indicating how much battery power is remaining, or how long the remaining battery power is sufficient to operate mobile 110 for.

Where mobile 110 has informed a serving base station of information associated with mobile 110, the serving base station may be configured to provide the information, at least in part, to a target base station in case mobile 110 undergoes a handover procedure out of the serving cell. For example, the target cell may use the information associated with mobile 110 to provide services in a form that is optimized for mobile 110. As an example, the target base station may choose to employ a version of a codec that mobile 110 has expressed a preference for in the earlier serving cell, or where mobile 110 has expressed a preference for a highly power-saving configuration, the target cell may configure mobile 110 with a highly power-saving DRX pattern. The serving cell may be configured to inform the target cell of the information associated with mobile 110 by including the information in a handover request message transmitted to the target base station. In some embodiments, the target cell is configured to retrieve the information associated with mobile 110 from a central repository into which the serving cell has stored a copy of the information associated with mobile 110. In some embodiments, the serving cell is configured to send a message to the target cell, the message being separate from the handover request and the message comprising the associated with concerning mobile 110.

In case mobile 110 transmits a measurement report that triggers a handover procedure from a source cell to a target cell, and during the handover the information associated with mobile 110 changes, it may occur that the target cell is provided with outdated information associated with mobile 110. For example, if the handover procedure is in progress and mobile 110 determines that information associated with mobile 110 changes, the target cell may already be furnished with information associated with mobile 110 that was valid when the handover process began but which is now out of date. Subsequently, when mobile 110 associates with the target cell and the target cell becomes the new serving cell, the target cell may erroneously believe it has correct information associated with mobile 110, and mobile 110 may erroneously believe the target cell knows the correct information associated with mobile 110. In this case, the target cell may, for example, propose to use a codec mobile 110 doesn't prefer, or the target cell may configure mobile 110 with a DRX pattern that is unsuitable for the battery level or power saving preference prevailing in mobile 110.

To avoid the possibility of mismatching information associated with mobile 110, the target cell may be configured to include in a handover instruction it transmits to the source base station, and which the source base station may be configured to forward, at least in part, to mobile 110, information indicative of the information associated with mobile 110 the target base station has. The included information may comprise, for example, a copy of the power preference indicator the target base station was provided with in a handover request message from the source base station at the start of the handover process. As another example, where the information associated with mobile 110 is more extensive, the included information may comprise a hash of the information associated with mobile 110 the target base station has.

As mobile 110 may be configured to respond to receiving the handover command by associating with the target base station, the handover command may be received near the end of the handover process and the included information may enable mobile 110 to discover whether the target base station was provided with information that is outdated at the end of the handover process. Mobile 110 may be configured to determine whether there is a mismatch by comparing the included information to information associated with mobile 110 stored in mobile 110, or where a hash is in the included information, mobile 110 may be configured to derive a hash of the information associated with mobile 110 stored in mobile 110 and compare the derived hash to the hash included in the handover command.

Responsive to determining that a mismatch exists, mobile 110 may be configured to signal to the target base station, once the handover process is complete, the up-to-date information associated with mobile 110. By providing correct information to the target base station, the error situations described above may be avoided.

In some embodiments, mobile 110 may be configured to monitor for changes in the information associated with mobile 110 autonomously. Where mobile 110 detects that information associated with mobile 110 is changed or updated in mobile 110 after transmission of a measurement report that triggers a handover, but before associating with the target base station is complete, mobile 110 may be responsively configured to become operable to provide the changed or updated information associated with mobile 110 to the target base station after the handover is complete. In these embodiments, the target base station needn't include information on information associated with mobile 110 it has in a handover command message sent to the source base station. In some embodiments, mobile 110 may undergo a handover that is not triggered by a measurement report transmitted from mobile 110. In these embodiments, mobile 110 may determine if the information associated with mobile 110 stored in mobile 110 changes within a certain space of time preceding a handover, and responsive to such a change occurring within the space of time, mobile 110 may be configured to inform the target cell or base station of the changed information once the handover is complete. The length of the space of time may be predefined. Mobile 110 may be configured to perform the informing of the target base station responsive to the change occurring during the predefined space of time, and to refrain from the informing when more than the predefined space of time elapses from the change to the handover. The length of the space of time may be selected to correspond to a time needed to propagate the changes information to the target base station via the source base station. If there is time to propagate the change via the source base station, no mismatch is generated and separately informing from mobile 110 is not necessary.

In general, information associated with mobile 110 may comprise information concerning mobile 110.

In general there is provided a first apparatus, such as for example mobile 110 or a similar device, or a control device for inclusion in mobile 110 to control its functioning, comprising a transmitter configured to, optionally, cause a measurement report to be transmitted to a first base station. Where the first apparatus is a control device, such as for example a processor, chipset or other integrated circuit, the transmitter may comprise an output or input/output pin in the integrated circuit and an associated serial or parallel communication port in the integrated circuit. Causing the optional measurement report to be transmitted may comprise signaling from the transmitter to a radio transmitter, the signaling being conveyed internally in mobile 110, to cause the radio transmitter to transmit the measurement report. The radio transmitter may be comprised in a mobile 110, for example. Where the first apparatus is mobile 110 or a similar device, the transmitter may comprise a radio transmitter and causing the measurement report to be transmitted may comprise transmitting the measurement report from the radio transmitter. The measurement report may comprise, for example, received signal levels of beacon transmissions from base stations.

The first apparatus may further comprise at least one processing core configured to determine that information associated with the first apparatus, stored in the first apparatus, changes. Where the first apparatus comprises a control device, the control device may comprise the at least one processing core. The first apparatus may further comprise a receiver configured to receive a handover instruction instructing the first apparatus to handover to a second base station. Where the first apparatus comprises a control device, the receiver may comprise an input or input/output pin in the integrated circuit and an associated serial or parallel communication port in the integrated circuit. Receiving may comprise receiving signaling from a radio receiver in the receiver, the signaling being conveyed internally in mobile 110. Where the first apparatus is mobile 110 or a similar device, the receiver may comprise a radio receiver. The determination may take place prior to the first apparatus associating with the second base station. In detail, the determining that information associated with the first apparatus changes may occur during a time interval ending in association with the second base station and beginning at a point in time that precedes the association by a predefined length of time. Association with the second base station may comprise completion of the handover to the second base station.

In some embodiments, the at least one processing core is configured to cause the transmitter to inform the second base station of the changed information, for example at least in part responsive to the change in the information being determined during the time interval and not outside of it.

In embodiments where the first apparatus is configured to cause the optional measurement report to be transmitted, the at least one processing core may be configured to only perform the informing if the determining occurs subsequent to the transmitting of the measurement report and prior to the associating. The handover instruction may be comprised in a handover procedure triggered by the measurement report. The first apparatus may determine the handover instruction is comprised in such a handover procedure if, for example, at most a certain time elapses from the transmission of the optional measurement report to reception of the handover instruction.

In some embodiments, the handover instruction, which may comprise a handover command, comprises at least one indication of information associated with the first apparatus stored in the second base station.

In some embodiments, the at least one processing core is configured to, responsive to determining based at least in part on the at least one indication that there is a mismatch between information associated with the first apparatus stored in the apparatus and in the second base station, become operable to cause the transmitter to inform the second base station of the changed information. In other words, where the second base station and the first apparatus store disidentical versions of the information associated with the first apparatus, the at least one processing core may responsively be configured to become operable to inform the second base station of the changed information.

In some embodiments, the handover instruction is received in the first apparatus from the first base station, wherein the first base station may have received the handover instruction from the second base station. The handover instructions may indicate that the second base station is ready to receive the first apparatus.

In some embodiments, the first apparatus is configured to inform the second base station responsive to the determination In general there is provided a second apparatus, such as for example a base station, which is caused by a processor executing computer code to receive a handover request from a first base station, the handover request involving a first mobile station, and to transmit a handover message to the first base station, the handover message comprising at least one indication of information associated with the first mobile station, the information the indication being associated with being stored in the second apparatus.

Figure 3:
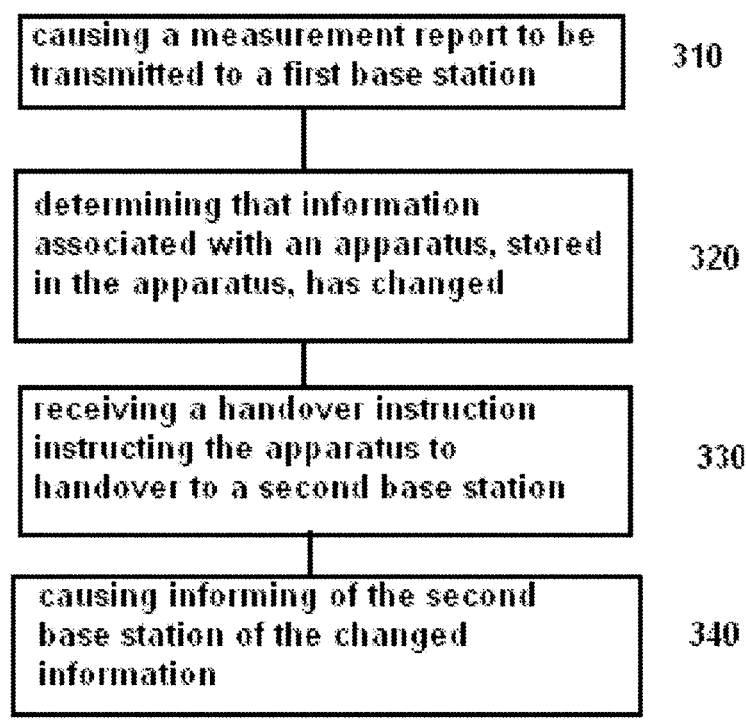
FIG. 3 is a flowchart illustrating a method in accordance with at least some embodiments of the invention.

FIG. 3 is a flowchart illustrating a method in accordance with at least some embodiments of the invention. In phase 310, a measurement report is caused to be transmitted, for example from a mobile 110, to a first base station. The measurement report may comprise results of measurements performed in a mobile 110 on beacon signals transmitted from base stations, for example. When received in the network, the measurement report may cause a handover preparation process to be initiated. In phase 320, it is determined that information associated with an apparatus, stored in the apparatus, has changed. The apparatus may comprise, for example, a mobile 110 or a control device for inclusion therein.

In phase 330, a handover instruction is received, for example in a mobile 110, instructing the apparatus, which may comprise for example a mobile 110, to handover to a second base station. Finally in phase 340, the second base station is caused to be informed of the changed information. Phase 340 may occur, for example in a mobile 110, at least in part responsive to phase 320 occurring during a time interval beginning from phase 310 and ending in the apparatus associating with the second base station.

Figure 4:
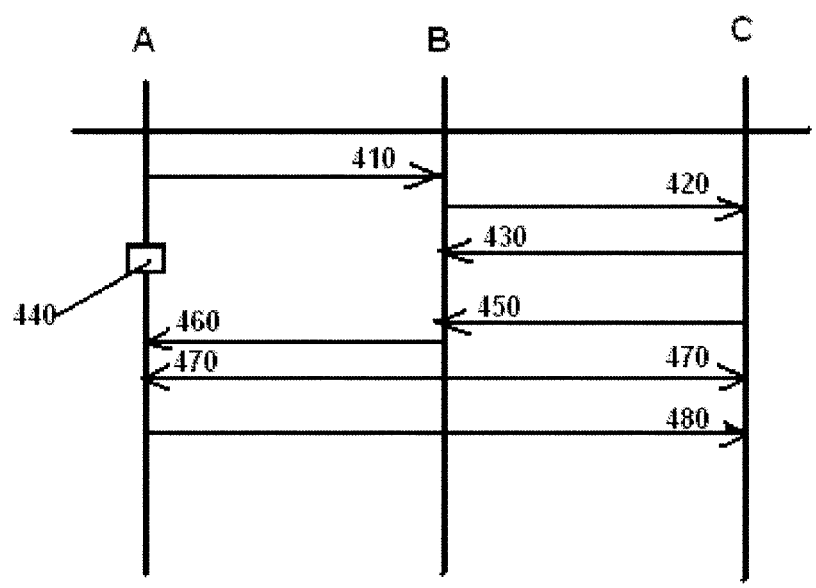
FIG. 4 is a signaling diagram in accordance with at least some embodiments of the invention.

FIG. 4 is a signaling diagram in accordance with at least some embodiments of the invention. The vertical lines A, B and C correspond in the figure to mobile 110, source base station and target base station, respectively.

In phase 410, mobile 110 transmits a measurement report to the source base station. Based at least in part on the measurement report, the source base station may decide to request handover to the target base station. In phase 420, the source base station transmits a handover request to the target base station, which may accept the handover request by transmitting, in phase 430, a handover request ack message. The handover request 420 may comprise information associated with mobile 110, which may comprise preference or status information, for example, as discussed above. In phase 440, mobile 110 determines a change in the information associated with mobile 110, for example the user may express a preference for a new power configuration, such as for example a preference for a low-power configuration. In some embodiments, a copy of at least part of this information was included in the handover request 420, wherefore the change of phase 440 causes a mismatch between a copy of the information stored locally in mobile 110 and a copy of the information stored in the target base station.

In phase 450, a handover instruction, such as for example a handover command, is received from the target base station. In some embodiments, the handover instruction 450 is comprised in phase 430, in other words phases 430 and 450 may comprise only one message sent from the target base station. Responsive to receiving the handover instruction, the source base station may be configured to transmit, in phase 460, a handover instruction, based at least in part on handover instruction 450, to mobile 110. In phase 470, mobile 110 attaches to the target base station, which becomes the serving base station. Phase 470 completes the handover process. In some embodiments of the invention, responsive to change 440 occurring during the handover, in other words after the transmission of the measurement report 410 and before attachment to the target base station 470, mobile 110 informs the target base station of change 440, phase 480, by transmitting a signal to the target base station once mobile 110 is successfully attached to a cell controlled by the target base station.

In some embodiments, the handover instruction or handover ack message of phase or phases 430 and 450 comprises at least one indication of information associated with mobile 110, the information being stored in the target base station. In these embodiments, mobile 110 informs the target base station in phase 480 only if mobile 110 determines based at least in part on the at least one indication and on its local copy of the information associated with mobile 110, that there exists a mismatch between the local copy and the copy stored in the target base station.

Figure 2:
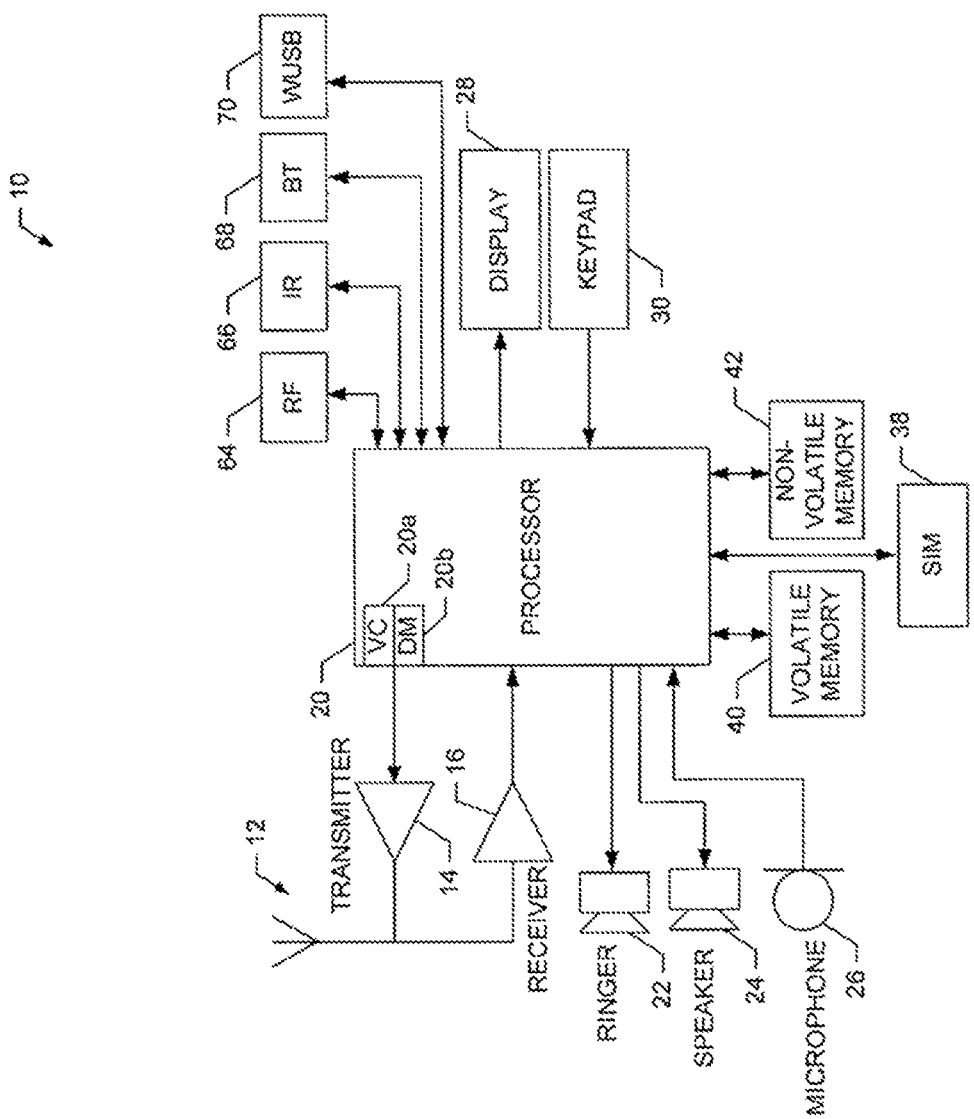
FIG. 2 illustrates a block diagram of an apparatus 10 such as, for example, a mobile terminal, in accordance with an example embodiment of the invention.

FIG. 2 illustrates a block diagram of an apparatus 10 such as, for example, a mobile terminal, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20*a*, an internal data modem, DM, 20*b*, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40 non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that error conditions generated in handover processes are reduces. Another technical effect of one or more of the example embodiments disclosed herein is that base stations will be able to refrain more effectively from configuring mobile stations with suboptimal configurations.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processing core configured to determine that information associated with the apparatus, stored in the apparatus, has changed;
   a receiver configured to receive a handover instruction instructing the apparatus to handover to a base station;
   the at least one processing core being configured to cause a transmitter to inform the base station of the changed information, wherein the at least one processing core is configured to cause the informing only if at most a predefined length of time elapses between the determination and associating with the base station.

2. The apparatus according to claim 1, wherein the apparatus is configured to cause a measurement report to be transmitted to a second base station, and the at least one processing core is configured to cause the informing only if the determining occurs subsequent to the transmitting of the measurement report and prior to the associating.

3. The apparatus according to claim 2, wherein the at least one processing core is configured to cause the transmitter to inform the base station responsive to the determination occurring subsequent to the transmission of the measurement report and prior to the apparatus associating with the base station.

4. The apparatus according to claim 1, wherein the handover instruction comprises at least one indication of information associated with the apparatus stored in the base station.

5. The apparatus according to claim 4, wherein the at least one processing core is configured to, responsive to determining based at least in part on the at least one indication that there is a mismatch between information associated with the apparatus stored in the apparatus and in the base station, become operable to cause the transmitter to inform the base station of the changed information.

6. The apparatus according to claim 1, wherein the information associated with the apparatus comprises preference information.

7. The apparatus according to claim 6, wherein the preference information comprises at least one of a power saving mode preference indication and a codec version preference indication.

8. The apparatus according to claim 1, wherein the handover instruction is received from a second base station.

9. The apparatus according to claim 1, wherein the apparatus comprises a mobile communication device, the apparatus further comprising an antenna coupled to the receiver and configured to provide signals to the at least one processing core.

10. A method, comprising:
    determining that information associated with an apparatus, stored in the apparatus, has changed;
    receiving a handover instruction instructing the apparatus to handover to a base station, and
    causing informing of the base station of the changed information, wherein causing the informing only occurs if at most a predefined length of time elapses between the determination and associating with the base station.

11. The method according to claim 10, wherein the handover instruction comprises at least one indication of information associated with the apparatus stored in the base station.

12. The method according to claim 11, wherein, responsive to determining based at least in part on the at least one indication that there is a mismatch between information associated with the apparatus stored in the apparatus and in the base station, the method comprises becoming operable to cause a transmitter to inform the base station of the changed information.

13. An apparatus, comprising:
    at least one processor; and
    at least one memory including computer program code
    the at least one memory and the computer program code configured to, with the at least one processor, cause the apparatus to perform at least the following:
        receive a handover request from a first base station, the handover request involving a first mobile station, and
        transmit a handover message to the first base station, the handover message comprising at least one indication of information associated with the first mobile station stored in the apparatus.

14. The apparatus according to claim 13, wherein the information associated with the first mobile station comprises preference information.

15. The apparatus according to claim 14, wherein the preference information comprises at least one of a power saving mode preference indication and a codec version preference indication.

16. The apparatus according to claim 13, wherein the handover request comprises the information associated with the first mobile.

17. A method, comprising:
    receiving a handover request from a first base station, the handover request involving a first mobile station, and
    transmitting a handover message to the first base station, the handover message comprising at least one indication of information associated with the first mobile station stored in the apparatus.

18. A computer program product comprising a computer-readable medium bearing computer program code embodied therein for use with a computer, the computer program code comprising:
    code for determining that information associated with an apparatus, stored in the apparatus, has changed;
    code for receiving a handover instruction instructing the apparatus to handover to a base station;
    code for causing informing of the second base station of the changed information, wherein causing the informing only occurs if at most a predefined length of time elapses between the determination and associating with the base station.

19. A computer program product comprising a computer-readable medium bearing computer program code embodied therein for use with a computer, the computer program code comprising:
    code for receiving a handover request from a first base station, the handover request involving a first mobile station, and
    code for transmitting a handover message to the first base station, the handover message comprising at least one indication of information associated with the first mobile station stored in the apparatus.

* * * * *